(12) United States Patent
Yue et al.

(10) Patent No.: US 8,751,458 B2
(45) Date of Patent: *Jun. 10, 2014

(54) METHOD AND SYSTEM FOR SAVING DATABASE STORAGE SPACE

(75) Inventors: Xu Qiang Yue, Hangzhou (CN); Chen Zhu, Hangzhou (CN); Ke Jin, Hangzhou (CN); Hu Wei, Hangzhou (CN); Jing Feng Luo, Hangzhou (CN); Ling Cao, Hangzhou (CN)

(73) Assignee: Alibaba Group Holding Limited (KY)

( * ) Notice: Subject to any disclaimer, the term of this patent is extended or adjusted under 35 U.S.C. 154(b) by 141 days.

This patent is subject to a terminal disclaimer.

(21) Appl. No.: 13/352,170

(22) Filed: Jan. 17, 2012

(65) Prior Publication Data

US 2012/0124004 A1 May 17, 2012

Related U.S. Application Data

(63) Continuation of application No. 12/462,081, filed on Jul. 29, 2009, now Pat. No. 8,126,850.

(30) Foreign Application Priority Data

Aug. 13, 2008 (CN) .......................... 2008 1 0147054

(51) Int. Cl.
*G06F 17/00* (2006.01)

(52) U.S. Cl.
USPC ........... 707/670; 707/600; 707/661; 707/758; 707/790; 711/161

(58) Field of Classification Search
None
See application file for complete search history.

(56) References Cited

U.S. PATENT DOCUMENTS

| 6,754,666 B1 * | 6/2004 | Brookler et al. ...................... 1/1 |
| 2003/0217052 A1 * | 11/2003 | Rubenczyk et al. .............. 707/3 |
| 2005/0131919 A1 * | 6/2005 | Brookler et al. .............. 707/100 |
| 2007/0061359 A1 * | 3/2007 | Kilday ...................... 707/103 R |
| 2007/0156735 A1 * | 7/2007 | Iyer et al. ...................... 707/101 |
| 2008/0162512 A1 * | 7/2008 | Mall ............................. 707/100 |
| 2012/0233170 A1 * | 9/2012 | Musgrove et al. ............ 707/740 |

* cited by examiner

*Primary Examiner* — Hung Le
(74) *Attorney, Agent, or Firm* — Van Pelt, Yi & James LLP

(57) ABSTRACT

Saving database storage space includes receiving, using a processor, one or more properties associated with a newly released commodity input at a front-end server; determining whether the one or more properties of the newly released commodity match a standard property unit (SPU), wherein the SPU includes a plurality of properties common to at least two commodities of which data is stored at a back-end server; and in the event that the one or more properties of the newly released commodity match the SPU, storing data associated with binding the newly released commodity with the matching SPU at the back-end server.

16 Claims, 6 Drawing Sheets

METHOD AND SYSTEM FOR SAVING DATABASE STORAGE SPACE

CROSS REFERENCE TO OTHER APPLICATIONS

This application is a continuation of co-pending U.S. patent application Ser. No. 12/462,081, entitled METHOD AND SYSTEM FOR SAVING DATABASE STORAGE SPACE filed Jul. 29, 2009 which is incorporated herein by reference for all purposes, which claims priority to People's Republic of China Patent Application No. 200810147054.5 entitled METHOD AND SYSTEM FOR SAVING DATABASE STORAGE SPACE filed Aug. 13, 2008 which is incorporated herein by reference for all purposes.

FIELD OF THE INVENTION

The present invention relates generally to the field of computer network technology and more particularly to method and system for saving database storage space.

BACKGROUND OF THE INVENTION

With the development of computer network technology and the boom of online shopping, a lot of shopping sites have appeared. Sellers typically register with a shopping site, upload commodity information and complete the transactions at home.

For example, presently the shopping site taobao.com has 180 million items for sale (also referred to as commodities). Each commodity released by a seller has its corresponding name, picture, brief description, price range and related properties. Since the same product may be released by multiple sellers as multiple commodities, there is a lot of redundancy in the data of these commodities. Take the Nokia N73 mobile phone for example, each time a seller releases a Nokia N73 phone as a commodity, the corresponding picture(s), description of the product, the functions and other information are entered by the seller and stored. When a large number of sellers are selling the same mobile phone, a great deal of duplicate data is stored. Since the typical shopping sites use databases to store the commodity entries, maintaining a large number of commodities in the database can be expensive.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
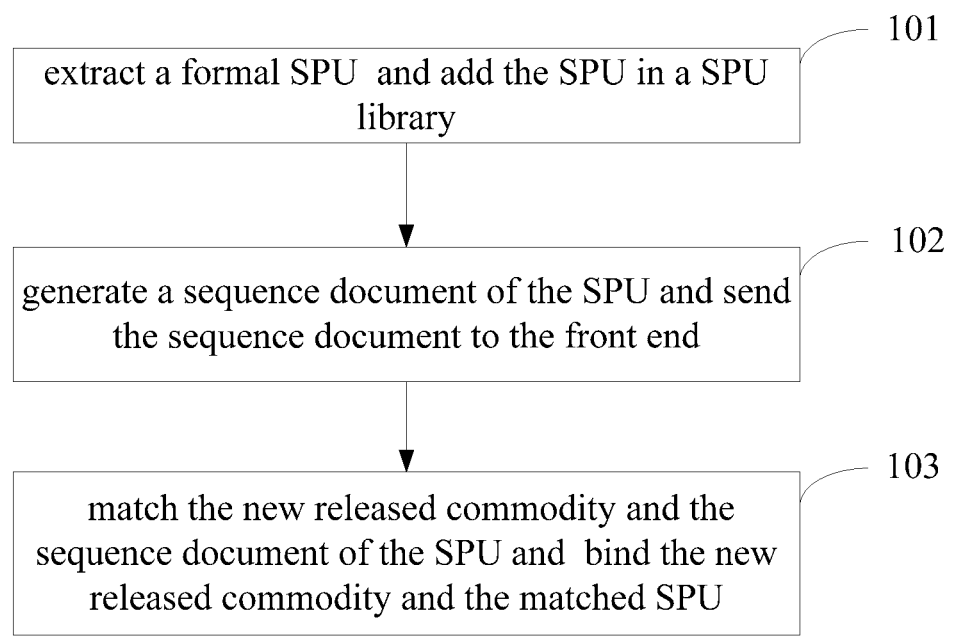
FIG. 1 is a flowchart illustrating an embodiment of a process for saving database storage space.

FIG. 1 is a flowchart illustrating an embodiment of a process for saving database storage space.

In the process shown, at 101, a formal standard property unit (SPU) is extracted from commodity information and is added to a SPU library. As used herein, a SPU refers to an aggregation of a set of one or more products that share a set of one or more identical properties. In some embodiments, a SPU is implemented as a collection of a group of common properties of a back-end standard category leaf node. In some embodiments, a SPU has the following properties: a name, a brief description, one or more pictures, a price, one or more main properties and one or more binding properties and an association with other SPUs. Among a multitude of commodities, a server can classify the commodities with common properties together to form a SPU. The SPU is saved in the form of a data table that includes the SPU's ID and the data table is associated with a list of categories using the ID, to represent the category that a SPU belongs to, so that all SPUs under a category can be found. SPUs can be re-used.

In some embodiments, extracting the SPU and including it in a SPU library includes: search the key properties of the commodity in commodity information; based at least in part on the found key properties of the commodity, identify common properties of the commodity using techniques such as data mining of database; based at least in part on the common properties of the commodity, use cluster analysis to extract a candidate SPU that includes common properties of the commodity; verify whether the candidate SPU indeed includes the common properties of the commodity; if verified, generating a formal SPU and including it in a SPU library.

At 102, based on the SPUs in the SPU library, a SPU sequence document is generated and the sequence document is sent to the front end periodically according to predetermined time intervals.

As used herein, a sequence document of a SPU is a collection of the data in the database, including the category from the back-end, the SPU, SPUs that are associated with this SPU and other appropriate information. For example, in the sequence document of SPU for the mobile phone Nokia N73, the back-end category is mobile phone and a SPU can be found for the category. The SPU includes the following information: the brand is Nokia, the model is N73 and the operating system is Symbian. Other SPUs associated with this SPU can also be found (such as the SPU of the battery of Nokia N73 or other accessories of this mobile phone model).

In some embodiments, generating a sequence document of a SPU includes: acquiring category information from the back-end categories, acquiring all the SPUs of the category by querying the SPU library using the acquired category information and generating the sequence document using the acquired SPUs.

At 103, it is determined whether a newly released commodity matches the SPU in the sequence document of SPU. If so, the new released commodity and the matching SPU are bound. The binding of the new released commodity and the matching SPU includes: establishing a corresponding relationship of the new released commodity and the matching SPU and saving the corresponding relationship for subsequent operations.

If the newly released commodity matches a SPU in a sequence document, the corresponding relationship of the matching SPU and the new released commodity is established. Any mismatched properties that are deemed to be the special properties of the commodity are saved in the field of property.

In some embodiments, database mining techniques such as cluster analysis are applied to a back-end category of commodities having the same properties. The common properties of commodities are extracted and are introduced into the SPU to indicate the common properties of the commodities. If a newly released commodity matches a sequence document of a SPU, then the commodity and the matching SPU in the sequence document are bound. Instead of separately tracking billions of commodities, only millions of SPUs need to be tracked. Thus, storage space is saved and commodities are conveniently standardized. In addition, by using the SPU pictures, it can save picture storage space and reduce storage costs and network traffic.

Figure 2:
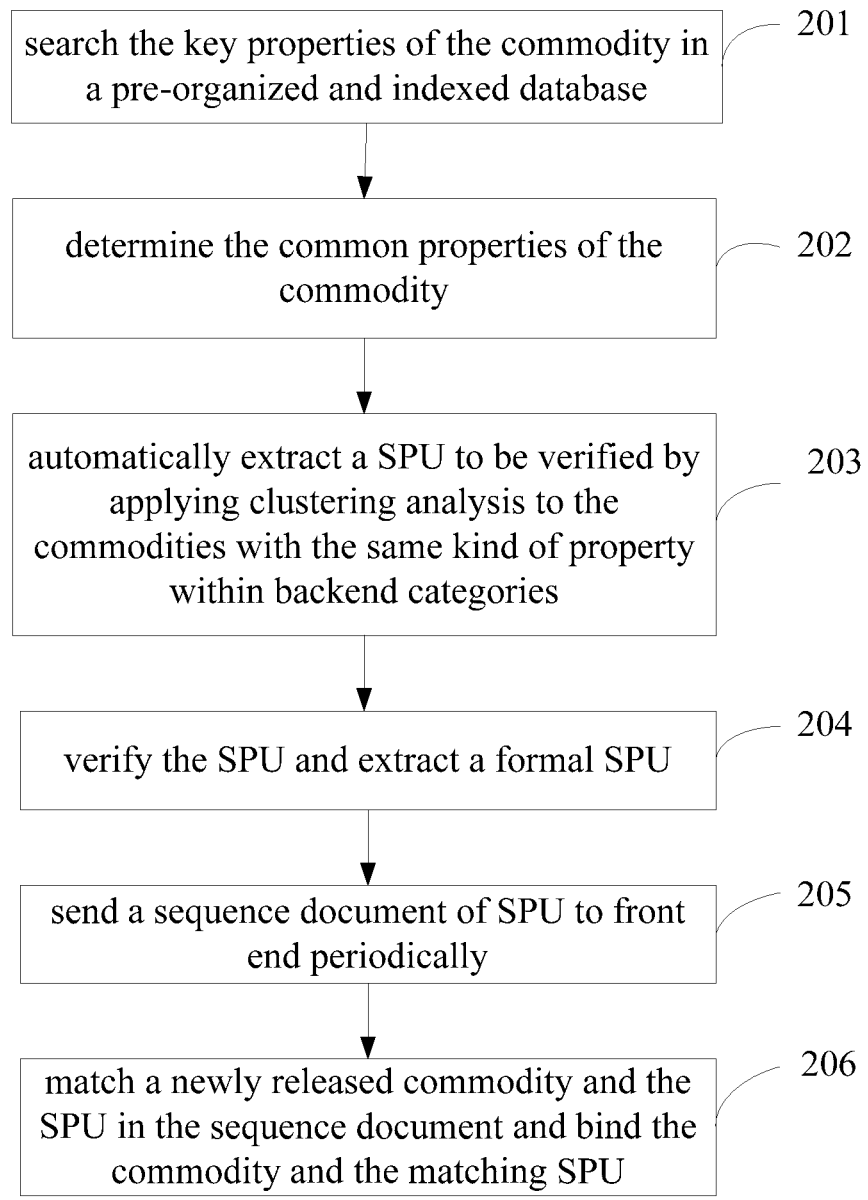
FIG. 2 is a flowchart illustrating another embodiment of a process for saving database storage space.

FIG. 2 is a flowchart illustrating another embodiment of a process for saving database storage space.

In this example, at 201, the key properties of a commodity are searched in a database. In some embodiments, a search engine is used to pre-organize and index the database. The search engine collects millions to billions of commodities and indexes the combination of each property and property value of commodities to establish a full-text search engine of the index database. When searching for a certain main property, all the commodity properties including the combination of the property and property value will be found as search results.

At 202, using to the key properties found in 201, common properties of the commodity are determined. In some embodiments, database mining techniques are used to determine the common properties of the commodity.

Data mining is used to extract the knowledge people are interested in from the data of large database. The knowledge is connotative, unknown in advance and is potentially useful information. The knowledge extracted is represented to be concepts, rules, regularities, patterns and other forms. This definition also defines the subject of data mining as a database and, generally speaking, data mining is a decision-making support process to find out a pattern in a number of facts or collections of observational data. The subject of data mining is not only a database, but also can be a file system or any other data collection organized together. The ultimate goal of data mining is to discover the connotative mode which cannot be detected easily. Generally speaking, the easiest mode to be understood among these patterns is the statistical model. Secondly, they is the external detection of data, the recognition, classification or clustering of a large-scale data collection. Finally, it is to solve the problems related to multi-dimensional space and huge data processing in a majority of database management systems from the theory and calculating aspects.

After the search engine has found the key properties of commodities from the database, the data mining techniques for the database is used to further mine the properties of the commodities from the database and calculate the common properties of the commodities. The common properties of the commodities mentioned here refer to the regularity or the rule [if then] existing among different key properties values among a large amount of data.

At 203, based on the common properties of the commodity determined in 202, cluster analysis is applied to commodities with the same kind of property within the same backend category and a candidate SPU is extracted to be verified with the common properties of the commodity.

As used herein, a back-end category refers to the type of commodity, such as mobile phone, mp3 and so on. The data structure of a back-end category includes a table of the standard list of category from back-end, related properties of commodities and related SPUs.

At 204, the candidate SPU is verified. The candidate SPU extracted in 203 may not be exact and should to be verified by a human to judge whether the candidate SPU indeed has the common properties of the commodity. If verification succeeds, a formal SPU is extracted and added into a SPU library.

At 205, the formal SPU is calculated to generate a sequence document of the SPU and the sequence document of the SPU is sent to the front-end periodically.

At 206, it is determined whether the newly released commodity matches the sequence document of the SPU sent periodically in 205. When a seller releases a new commodity, the seller is asked to select the properties of the commodity. A user interface with property choices is provided in some embodiments. The properties the seller chose are compared with the SPU sequence document which is sent to the front-end periodically. If there is a match, the commodity and the matching SPU are bound. The not-matched properties are considered to be special properties of the commodity and are saved in the field of property of the commodity.

Figure 3:
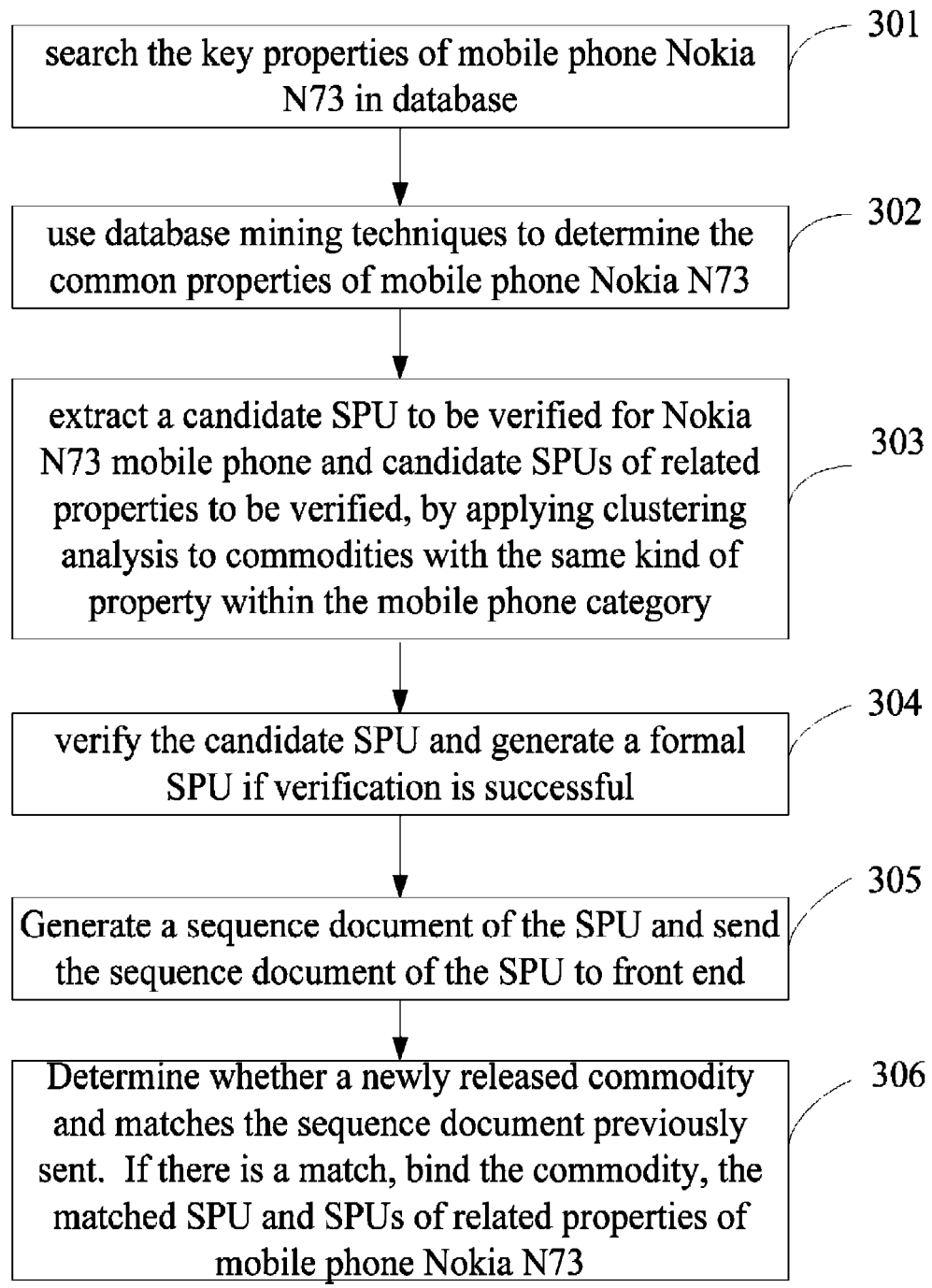
FIG. 3 is a flowchart illustrating an example process for saving database storage space.

FIG. 3 is a flowchart illustrating an example process for saving database storage space.

At 301, the key properties of the commodity in a database are searched automatically by a search engine. Take searching for mobile phone Nokia N73 for example. The properties of mobile phone Nokia N73 found by a search engine include: the brand is Nokia, the model is N73 and the operating system is Symbian.

At 302, according to the key properties searched in step 301, using database mining techniques to mine the common properties of the commodity. For example, the property collection of mobile phone Nokia N73 is obtained by searching. Calculating the searched key properties of mobile phone Nokia N73 by database mining techniques and extracting the common properties of mobile phone Nokia N73: the brand is Nokia, the model is N73, the memory card is mini SD and the operating system is Symbian and so on.

At 303, according to the common properties of the commodity found in 302, a SPU is extracted and verified with the common properties of the commodity by applying cluster analysis to the commodities with the same kind of properties within the back-end categories. In this case, the back-end category is mobile phone. According to the common properties of the commodity determined by database mining techniques, the common properties of mobile phone Nokia N73 are extracted by using cluster analysis and other techniques. A candidate SPU is generated and ready to be verified. Other related properties of mobile phone Nokia N73 (such as mobile phone accessories, etc.) generate related candidate SPUs to be verified.

At 304, the candidate SPU is verified and a formal SPU is approved. The SPU obtained in 303 may be not exact and should be verified by a human to determine whether the SPU indeed has the common properties of the commodity. If the verification is successful, a formal SPU is generated and put into a SPU library.

At 305, the formal SPU is used to generate a sequence document of SPU and the sequence document is sent to the front-end periodically.

At 306, it is determined whether a newly released commodity matches the sequence document sent periodically in step 305. When a seller releases new commodity, the seller chooses the properties of the commodity via a user interface. The properties chosen by the seller and the sequence document sent periodically are compared. If there is a match, the commodity and the matched SPU are bound. The unmatched properties are considered to be special properties of the commodity and are saved in the field of property of the commodity. Thus, if a newly released commodity by the seller is mobile phone Nokia N73, this commodity is bound to the SPU of mobile phone Nokia N73. Moreover, the SPU can be associated with related SPUs (such as the SPU of battery for mobile phone Nokia N73).

Figure 4:
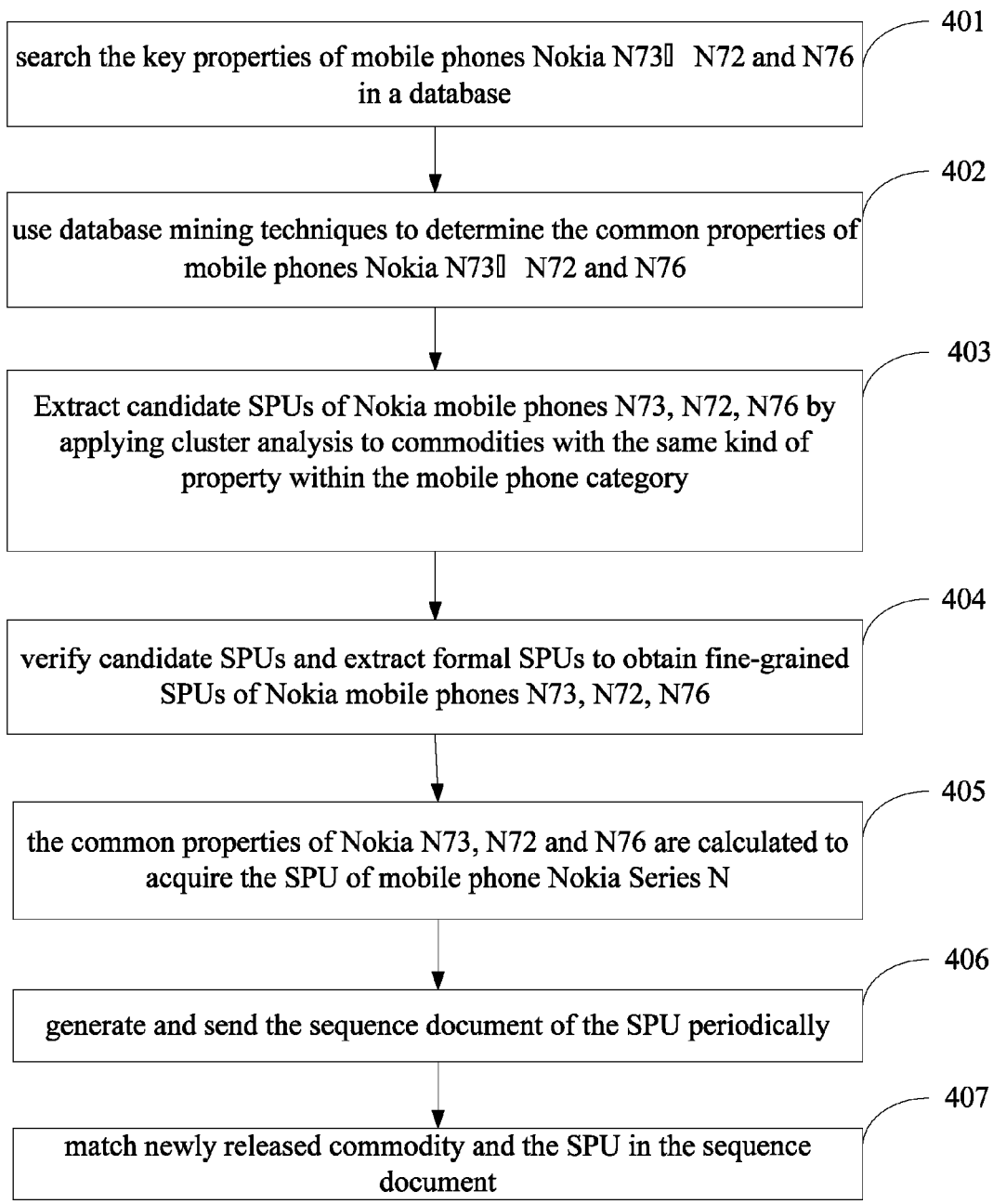
FIG. 4 is a flowchart illustrating another example of a process for saving database storage space.

FIG. 4 is a flowchart illustrating another example of a process for saving database storage space. In this example, the process includes the following:

At 401, the key properties of the certain commodities are searched in a database, preferably by a search engine. For example, mobile phones Nokia N73, N72 and N76 are searched using a search engine and the properties of these mobile phones are obtained, including the brand, the operating system, the type of memory card, the ring type, any advanced features, number of pixels and so on.

At 402, according to the key properties found in 401, using the database mining techniques to determine the common properties of the commodity. For example, the search obtains a collection of various properties for mobile phones Nokia N73, N72 and N76. Based on the collection of properties, data mining techniques are applied and the common properties of mobile phones Nokia N73, N72 and N76 are extracted.

At 403, based on the common properties of the commodity determined in 402, cluster analysis is applied to back-end categories that have the same kinds of properties to extract candidate SPUs that have the same common properties. In this case, based on the common properties determined by database mining techniques, the common properties of mobile phones Nokia N73, N72 and N76 are extracted by cluster analysis and other techniques to generate candidate SPUs to be verified. The related properties (such as mobile phone accessories, etc.) generate related SPUs to be verified for mobile phones Nokia N73, N72 and N76.

At 404, the candidate SPUs are verified and formal SPUs are extracted if verifications are successful. Since the candidate SPUs obtained in 403 may be not exact, they should be verified by human to determine whether the SPUs have the common properties of the commodities. If so, formal SPUs for mobile phone Nokia N73, N72 and N76 are generated respectively and added to the SPU library.

At 405, the SPUs obtained in 404 are fine-grained SPUs which all have the common properties. The common properties of Nokia N73, N72 and N76 are calculated to acquire the SPU of mobile phone Nokia Series N, in which a coarse-grained SPU which includes fine-grained SPUs for the individual models.

At 406, formals SPUs are used to generate sequence documents of the SPUs. The sequence documents are sent to the front-end periodically.

At 407, it is determined whether a newly released commodity matches the sequence documents. When a seller releases a new commodity, the seller chooses the properties of the commodity via a user interface. The properties chosen by the seller and the sequence documents sent periodically are compared. If there is a match, the commodity and the matching SPU are bound. Any unmatched properties are considered special properties of the commodity and are saved in the field of property of the commodity.

Figure 5:
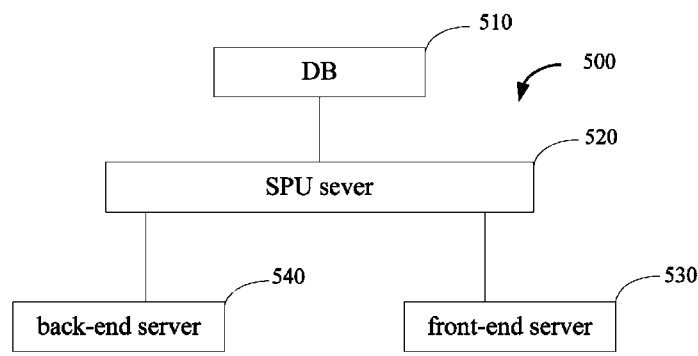
FIG. 5 is a system diagram illustrating an embodiment of a system for saving database storage space.

FIG. 5 is a system diagram illustrating an embodiment of a system for saving database storage space. System 500 shown in this example may be used to implement the processes described above in connection with FIGS. 1-4. In this example, system 500 includes a database (DB) 510, a SPU server 520, a back-end server 530 and a front-end server 540.

DB 510 is used for storing commodity information and formal SPUs. For example, on the shopping site Taobao, when a seller releases new commodities, each commodity corresponds to a name, picture, brief description, price range, related properties and other information which are stored in DB 510. The formal SPUs from the server 520 are also stored in DB 510.

In some embodiments, DB 510 is a data collection organized according to some data model and stored in a second-level memory. That data collection has the following characteristics: it is highly non-repetitive, serves for a variety of applications of a certain organization optimally, employs data structures that are independent of the application program and the adding, deleting, changing and searching of data is managed and controlled by uniform software.

SPU server 520 is configured to cache the data from DB 510 and back-end server 530, such as the formal SPUs and commodity properties from DB 510 and the formal SPUs from back-end server 530. The formal SPU is calculated to generate a sequence document of SPU. The sequence document of SPU is sent to front-end server 540 periodically under the control of a set program. The commodity properties are sent to back-end server 530. The formal SPU generated by back-end server 530 are sent to DB 510.

Back-end server 530 is configured to generate automatically a candidate SPU to be verified by program according to the commodity properties from the server 520 and generating a formal SPU by operating verification. Back-end server 530 searches for the commodity properties from the server 520 by a search engine, extracts the key properties of commodity, mines the common properties of commodity by using database mining techniques and applies cluster analysis to the common properties, generates a SPU to be verified with the common properties of the commodity and verifies whether the SPU is the common properties of the commodity. If so, back-end server 530 generates a formal SPU and sends it to SPU server 520.

Front-end server 540 is configured to receive the SPU sequence document sent by SPU server 520 periodically and to match the newly released commodity with the SPU in the sequence document. Front-end server 540 receives and saves the sequence documents sent by SPU server 520 periodically. When a seller releases a new commodity, the seller first chooses the properties of the commodity via a user interface. Front-end server 540 compares the properties chosen by the seller and the SPU in the sequence document of SPU stored in the front-end server 540 to determine whether there is a match between the commodity and the SPU. The unmatched properties are considered the special properties of the commodity and are saved in the field of property of the commodity.

Figure 6:
FIG. 6 is a system diagram showing an embodiment of a DB.

FIG. 6 is a system diagram showing an embodiment of a DB such as 510. In this example, the DB is shown to include a first storing module 511 and a second storing module 512.

The first storing module 511 is configured to store the formal SPU with the common properties of the commodity from SPU server 520.

The second storing module 512 is configured to store all commodity information.

Figure 7:
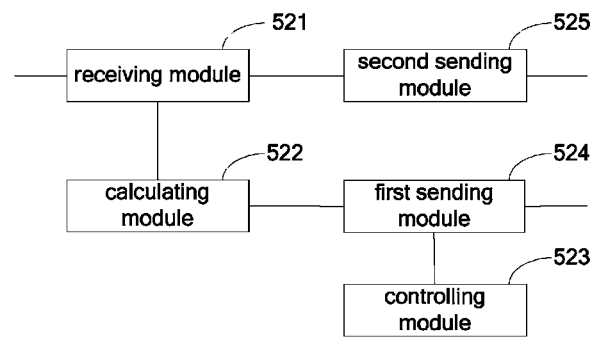
FIG. 7 is a block diagram illustrating an embodiment of a SPU server.

FIG. 7 is a system diagram illustrating an embodiment of a SPU server such as 520. In this example, the SPU server includes a receiving module 521, a calculating module 522, a controlling module 523, a first sending module 524 and a second sending module 525.

The receiving module 521 is configured to receive the formal SPU and commodity information from DB 510 and the formal SPU from the second sending module 525. The formal SPU from DB 510 is sent to the calculating module 522, the commodity information from DB 510 is sent to the second sending module 525 and the formal SPU from the second sending module 525 is sent to DB 510.

The calculating module 522 configured to calculate based the formal SPU from the receiving module 521 to generate a sequence document of SPU and to send the sequence document of SPU to the first sending module 524.

The first sending module 524 is configured to send the sequence document of SPU from the calculating module 522 under the control of the controlling module 524.

The second module 525 is configured to send commodity information to back-end server 530 and receiving the formal SPU generated by back-end server 530.

The control module 523 is configured to control the first sending module 524 to send a sequence document of SPU periodically by setting the time interval for sending the sequence document of SPU.

Figure 8:
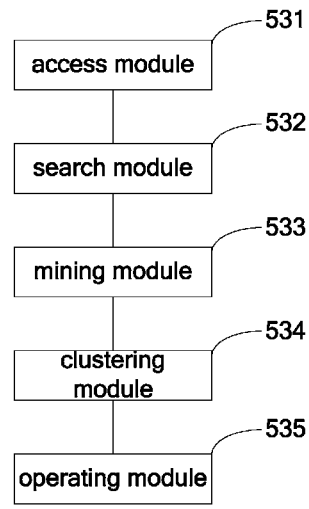
FIG. 8 is a block diagram illustrating an embodiment of a back-end server.

FIG. 8 is a block diagram illustrating an embodiment of a back-end server such as 530. In the example shown, the back-end server comprises an accessing module 531, a searching module 532, a mining module 533, a clustering module 534 and an operating module 535.

The access module 531 is configured to access commodity information from DB 510 and to send commodity information to the searching module 532.

The search module 532 is configured to search for the commodity properties from accessing module 531 to get the key properties of the commodity.

The mining module 533 configured to receive the key properties of the commodity searched by searching module 532, and to extract the common properties of the commodity by using database mining techniques.

The clustering module 534 is configured to apply cluster analysis to the common properties of the commodity extracted by the mining module 533 and to generate a SPU to be verified.

The operating module 535 is used to receive the SPU to be verified generated by the clustering module 534, to verify the SPU by the operating module 535 and to determine whether the SPU to be verified has the common properties of the commodities. If so, the operating module also generates a formal SPU and sends the formal SPU to SPU server 520.

Figure 9:
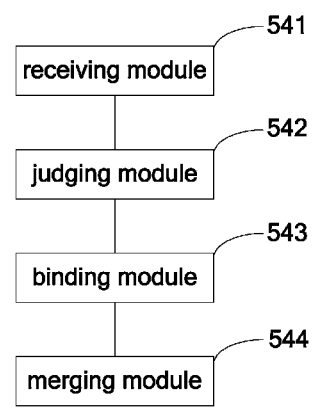
FIG. 9 is a block diagram illustrating an embodiment of a front-end server.

FIG. 9 is a block diagram illustrating an embodiment of a front-end server such as 540. In this example, the front-end server includes a receiving module 541, a determining module 542, a binding module 543 and a merging module 544.

The receiving module 541 is configured to receive the sequence document of SPU and the commodity information released when the seller releases commodity from SPU server 520, including the list of categories it belongs to, properties and so on.

The determining module 542 is configured to determine whether the released commodity properties from the receiving module 541 match the SPU in the sequence document of SPU.

The binding module 543 is configured to bind the commodity and the sequence document of SPU according to the result judged by determining module 542. If there is a match, the commodity and the matching SPU are bound.

The merging module 544 is configured to merge the standard properties from the SPU bound by binding module 543 and the personal properties of the commodity and to display to a buyer when the buyers view the commodity details.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as CD-ROM, U disk, mobile hard disk, etc.), including a number of instructions for making a computer device (such as personal computers, servers, network equipments, etc.) implement the methods described in the embodiments of the present invention. The modules may be implemented on a single device or distributed across multiple devices. The functions of the modules may be merged into one another or further split into multiple sub-modules.

Using SPUs to represent the common properties of the commodities can save storage space and regulate commodities conveniently, as well as save the picture storage space, reduce storage costs and network traffic by using the pictures from the SPU.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for saving database storage space, comprising:
   receiving, using a processor, one or more properties associated with a newly released commodity input at a front-end server;
   determining whether the one or more properties of the newly released commodity match a standard property unit (SPU), wherein the SPU includes a plurality of properties common to at least two commodities of which data is stored at a back-end server, wherein the SPU is associated with at least one other associated SPU; and in the event that the one or more properties of the newly released commodity match the SPU, storing data associated with binding the newly released commodity with the matching SPU at the back-end server.

2. The method of claim 1, wherein the SPU is bound to the at least two commodities of which data is stored at the back-end server.

3. The method of claim 1, further comprising generating a sequence document based at least on the SPU, wherein the sequence document includes data associated with commodities bound to the SPU, a product category associated with the back-end server, and one or more other associated SPUs.

4. The method of claim 3, further comprising sending the sequence document to the front-end server.

5. The method of claim 3, wherein determining whether the one or more properties of the newly released commodity match the SPU includes comparing the one or more properties associated with the newly released commodity input at the front-end server to the sequence document associated with the SPU.

6. The method of claim 1, wherein the SPU comprises a stored image configured to be used at the front-end server with a commodity bound to the SPU.

7. The method of claim 1, wherein a property associated with the newly released commodity input at the front-end server that does not match the SPU is stored as a special property associated with the newly released commodity.

8. A system for saving database storage space, comprising:
one or more processors configured to:
receive one or more properties associated with a newly released commodity input at a front-end server;
determine whether the one or more properties of the newly released commodity match a standard property unit (SPU), wherein the SPU includes a plurality of properties common to at least two commodities of which data is stored at a back-end server, wherein the SPU is associated with at least one other associated SPU; and
in the event that the one or more properties of the newly released commodity match the SPU, store data associated with binding the newly released commodity with the matching SPU at the back-end server; and
a memory coupled to the one or more processors and configured to provide the processors with instructions.

9. The system of claim 8, wherein the SPU is bound to the at least two commodities of which data is stored at the back-end server.

10. The system of claim 8, wherein the one or more processors are further configured to generate a sequence document based at least on the SPU, wherein the sequence document includes data associated with commodities bound to the SPU, a product category associated with the back-end server, and one or more other associated SPUs.

11. The system of claim 10, wherein the one or more processors are further configured to send the sequence document to the front-end server.

12. The system of claim 11, wherein to determine whether the one or more properties of the newly released commodity match the SPU includes comparing the one or more properties associated with the newly released commodity input at the front-end server to the sequence document associated with the SPU.

13. The system of claim 8, wherein the SPU comprises a stored image configured to be used at the front-end server with a commodity bound to the SPU.

14. The system of claim 8, wherein a property associated with the newly released commodity input at the front-end server that does not match the SPU is stored as a special property associated with the newly released commodity.

15. A system for saving database storage space, comprising:
a database configured to store commodity information and SPUs;
a standard property unit server configured to:
receive one or more properties associated with a newly released commodity input at a front-end server;
determine whether the one or more properties of the newly released commodity match a standard property unit (SPU), wherein the SPU includes a plurality of properties common to at least two commodities of which data is stored at a back-end server, wherein the SPU is associated with at least one other associated SPU; and
in the event that the one or more properties of the newly released commodity match the SPU, store data associated with binding the newly released commodity with the matching SPU at the back-end server.

16. A system for saving database storage space, comprising:
one or more processors configured to:
receive one or more properties associated with a newly released commodity input at a front-end server;
determine whether the one or more properties of the newly released commodity match a standard property unit (SPU);
in the event that the one or more properties of the newly released commodity match the SPU, store data associated with binding the newly released commodity with the matching SPU at the back-end server; and
generate a sequence document based at least on the SPU, wherein the sequence document includes data associated with commodities bound to the SPU, a product category associated with the back-end server, and one or more other associated SPUs; and
a memory coupled to the one or more processors and configured to provide the processors with instructions.

* * * * *